US011483050B2

(12) United States Patent
Kaspersson et al.

(10) Patent No.: US 11,483,050 B2
(45) Date of Patent: Oct. 25, 2022

(54) ANTENNA SYSTEM WITH EFFICIENT USE OF COMMUNICATION RESOURCES

(71) Applicant: Telefonaktiebolaget LM Ericsson (publ), Stockholm (SE)

(72) Inventors: Ola Kaspersson, Varberg (SE); Tomas Lieback, Mölnlycke (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/415,580

(22) PCT Filed: Dec. 20, 2018

(86) PCT No.: PCT/EP2018/086390
§ 371 (c)(1),
(2) Date: Jun. 17, 2021

(87) PCT Pub. No.: WO2020/126013
PCT Pub. Date: Jun. 25, 2020

(65) Prior Publication Data
US 2022/0069883 A1 Mar. 3, 2022

(51) Int. Cl.
*H04B 7/02* (2018.01)
*H04B 7/06* (2006.01)
*H01Q 1/24* (2006.01)

(52) U.S. Cl.
CPC ........... *H04B 7/0691* (2013.01); *H01Q 1/246* (2013.01); *H04B 7/0608* (2013.01)

(58) Field of Classification Search
CPC ..... H04B 7/0691; H04B 7/0608; H01Q 1/246
(Continued)

(56) References Cited

U.S. PATENT DOCUMENTS

2016/0072566 A1* 3/2016 Meyer ................ H04B 7/0413
375/267

FOREIGN PATENT DOCUMENTS

WO  98/43315 A1  10/1998

OTHER PUBLICATIONS

International Search Report and Written Opinion dated Jul. 9, 2019 in International Application No. PCT/EP2018/086390 (9 pages total).
(Continued)

*Primary Examiner* — Zewdu A Kassa
(74) *Attorney, Agent, or Firm* — Rothwell, Figg, Ernst & Manbeck, P.C.

(57) ABSTRACT

The present disclosure relates to an antenna system (1, 1') comprising: —a first set of antenna ports (2), —a second set of antenna ports (3) separate from the first set of antenna ports (2), —a third set of antenna ports (28) that at least partly comprises each one of the first set of antenna ports (2) and the second set of antenna ports (3), —a transmitter arrangement (4, 4'), and —a receiver (5, 5'). The transmitter arrangement (4, 4') comprises a first transmitter (4a, 4a') adapted for transmission of signals by means of a first downlink communication resource (6, 38) via the first set of antenna ports (2) and a second transmitter (4b, 4b') adapted for transmission of signals by means of a second downlink communication resource (7, 39) via the second set of antenna ports (3). The receiver (5, 5') is adapted for reception of signals by means of a first uplink communication resource (6, 40) and a second uplink communication resource (7, 41) via the third set of antenna ports (28), where each communication resource defines, or is associated with, a certain bandwidth.

20 Claims, 5 Drawing Sheets

(58) Field of Classification Search
USPC ....... 375/267, 262, 261, 260, 259, 219, 316, 375/295
See application file for complete search history.

(56) References Cited

OTHER PUBLICATIONS

Gao, Xiang et al., "Multi-Switch for Antenna Selection in Massive MIMO", 2015 IEEE Global Communications Conference, Decembers, 2015, XP032872922 (6 pages total).

* cited by examiner

ANTENNA SYSTEM WITH EFFICIENT USE OF COMMUNICATION RESOURCES

CROSS REFERENCE TO RELATED APPLICATIONS

This application is a 35 U.S.C. § 371 National Stage of International Patent Application No. PCT/EP2018/086390, filed Dec. 20, 2018.

TECHNICAL FIELD

The present disclosure relates to an antenna system comprising a first set of antenna ports, a second set of antenna ports separate from the first set of antenna ports, and a third set of antenna ports that at least partly comprises each one of the first set of antenna ports and the second set of antenna ports. The antenna system further comprises a transmitter arrangement and a receiver.

BACKGROUND

Active Antenna Systems (AAS) is an important part of LTE (Long Term Evolution) and an essential part of 5G. AAS is a generic term that is often used to describe base stations that incorporate a large number of separate transmitters and antenna elements that can be used for MIMO (Multiple Input Multiple Output) and beamforming as an integrated product. This will be one of the key aspects of 5G as the industry moves higher up in frequency and more complex array antenna geometries are needed to achieve the desired link budget.

Often the IBW (instantaneous bandwidth) of AAS products is lower than the actual need/wish du to hardware limitations. This can be a limitation if the operator has access to a larger frequency band or scattered sub-bands.

One solution is to split the product into two parts. This would enable two separate IBW:S and make it possible to use frequencies in different parts of a wide band. However, half the antenna size and half the number of transmit/receive-branches will decrease the up-link (UL) budget by 3 dB, and the down-link (DL) budget by 3 dB (6 dB relative to max for one beam).

Existing AAS systems are often UL-limited due to limited UE output power, hence a degraded UL budget of 3 dB can be a severe problem.

There is thus a need to provide an antenna system without the above limitations, in particular without degrading UL performance.

SUMMARY

It is an object of the present disclosure is to provide an antenna system that is efficiently handles the available communication resources for taking advantage of the available bandwidth or bandwidths. It is also an object of the present disclosure to provide a corresponding method and wireless communication node Said object is obtained by means of an antenna system comprising a first set of antenna ports, a second set of antenna ports separate from the first set of antenna ports, and a third set of antenna ports that at least partly comprises each one of the first set of antenna ports and the second set of antenna ports. The antenna system further comprises a transmitter arrangement and a receiver. The transmitter arrangement comprises a first transmitter adapted for transmission of signals by means of a first downlink communication resource via the first set of antenna ports and a second transmitter adapted for transmission of signals by means of a second downlink communication resource via the second set of antenna ports. The receiver is adapted for reception of signals by means of a first uplink communication resource and a second uplink communication resource via the third set of antenna ports. Each communication resource defines, or is associated with, a certain bandwidth.

In this way, larger or scattered communication resources can be supported, enabling a lower product cost.

According to some aspects, at least one communication resource at least comprises one of a frequency channel, a time slot, and a coded channel.

This means that many types of communication resources are supported by means of the present disclosure.

According to some aspects, the first transmitter is adapted for transmission of signals within a first frequency band and the second transmitter is adapted for transmission of signals within a second frequency band that at least partly is spectrally separated from the first frequency band. The receiver is adapted for reception of signals within a third frequency band that comprises at least the first frequency band and the second frequency band.

According to some aspects, the antenna system comprises a switch assembly that is adapted to switch the sets of antenna ports to either the transmitter arrangement or to the receiver arrangement.

This enables TDD (Time Division Duplex).

According to some aspects, the first transmitter is adapted for transmission of signals within a first frequency band and the second transmitter is adapted for transmission of signals within a second frequency band. The receiver is adapted for reception of signals within a third frequency band and a fourth frequency band, where all the frequency bands are mutually spectrally separated.

According to some aspects, the antenna system comprises a filter assembly that is adapted to filter signals between on one hand the antenna ports and on the other hand the transmitter arrangement and the receiver arrangement.

This enables FDD (Frequency Division Duplex).

According to some aspects, each frequency band corresponds to a corresponding instantaneous bandwidth.

According to some aspects, the antenna system is an active antenna system (AAS).

This means that the present disclosure can be applied to AAS:s.

According to some aspects, the antenna system comprises an antenna arrangement which in turn comprises at least one antenna device of a first polarization.

According to some aspects, the antenna system comprises an antenna arrangement which in turn comprises at least one antenna device of a second polarization that is orthogonal to the first polarization.

This means that the present disclosure can be applied to antenna systems where an antenna arrangement either is single polarized or dual polarized.

According to some aspects, each set of antenna ports comprises at least one antenna port connected to at least one antenna device of the first polarization and at least one antenna port connected to at least one antenna device of the second polarization. Different antenna ports are here connected to different antenna devices.

According to some aspects, the first set of antenna ports comprises antenna ports connected to at least one antenna device of a first polarization, and where the second set of antenna ports comprises antenna ports connected to at least one antenna device of a second polarization that is orthogonal to the first polarization. Different antenna ports are here connected to different antenna devices.

According to some aspects, the antenna system comprises an antenna arrangement which in turn comprises a first number of rows of antenna devices and a second number of columns of antenna devices.

According to some aspects, the first set of antenna ports is connected to a first set of columns comprising a comprising a third number of columns and the second set of antenna ports is connected to a second set of columns, separate from the first set of columns and comprising a fourth number of columns. The third set of antenna ports comprises each one of the first set of antenna port and the second set of antenna ports.

In this way, two antenna sub-arrays are formed and placed side by side.

According to some aspects, the first set of antenna ports is connected to a first set of rows comprising a fifth number of rows, and the second set of antenna ports is connected to a second set of rows, separate from the first set of rows and comprising a sixth number of rows. The third set of antenna ports comprises each one of the first set of antenna ports and the second set of antenna ports.

In this way, two antenna sub-arrays are formed, where one antenna sub-array is placed on top of the other antenna sub-array.

The present disclosure also relates to a wireless communication node and a method, which are associated with the advantages mentioned above.

BRIEF DESCRIPTION OF THE DRAWINGS

The present disclosure will now be described more in detail with reference to the appended drawings, where.

DETAILED DESCRIPTION

Figure 1:
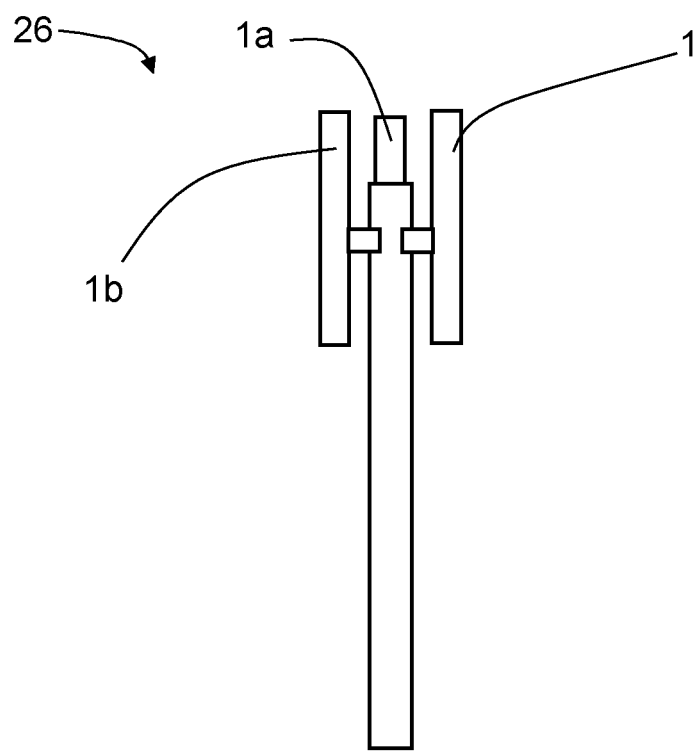
FIG. 1 schematically shows a wireless communication node.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

With reference to FIG. 1, there is a wireless communication node 26 that comprises at least one antenna system 1, 1a, 1b. In the following, one such antenna system 1 will be described.

Figure 2:
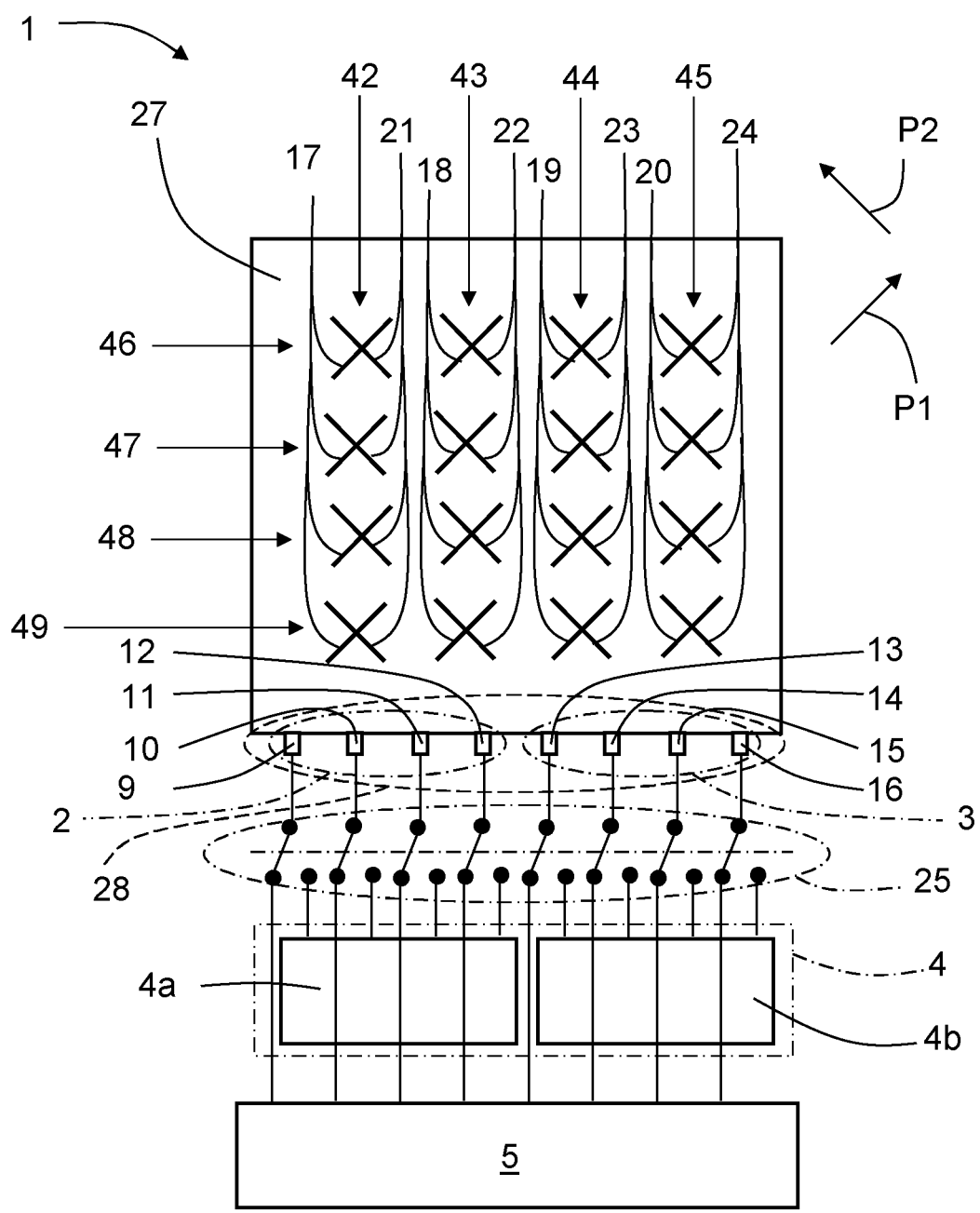
FIG. 2 schematically shows a front view of an antenna system according to a first example.

With reference to FIG. 2 there is an antenna system 1 used for wireless communication according to a first example, where the antenna system 1 comprises a first set of antenna ports 2, a second set of antenna ports 3 separate from the first set of antenna ports 2, and a third set of antenna ports 28 that comprises each one of the first set of antenna ports 2 and the second set of antenna ports 3. The antenna system further comprises a transmitter arrangement 4 and a receiver 5.

According to some aspects, the antenna system 1 comprises an antenna arrangement 27 which in turn comprises four antenna device 17, 18, 19, 20 of a first polarization P1 and four antenna devices 21, 22, 23, 24 of a second polarization P2 that is orthogonal to the first polarization P1.

According to some aspects, the first set of antenna ports 2 comprises four antenna ports 9, 11, 13, 15 where each one is connected to a corresponding antenna device 17, 18, 19, 20 of the first polarization P1 and the second set of antenna ports 3 comprises four other antenna ports 10, 12, 14, 16 where each one is connected to a corresponding antenna device 21, 22, 23, 24 of the second polarization P2. Different antenna ports 9, 10, 11, 12; 13, 14, 15 are connected to different antenna devices 17, 18, 19, 20; 21, 22, 23, 24. Each set of antenna ports is thus connected to a corresponding polarization P1, P2

Figure 3:
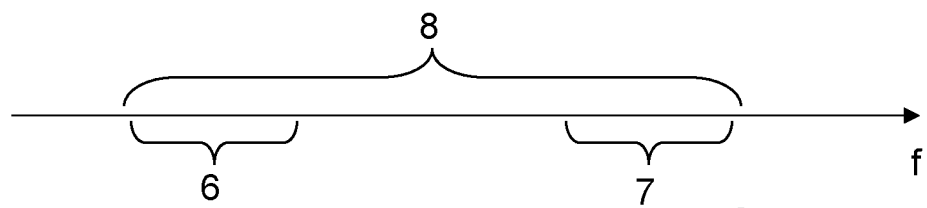
FIG. 3 schematically shows frequency band positions.

According to the present disclosure, with reference also to FIG. 3 and according to the first example, the transmitter arrangement 4 comprises a first transmitter 4a adapted for transmission of signals within a first frequency band 6 via the first set of antenna ports 2, and a second transmitter 4b adapted for transmission of signals within a second frequency band 7, that is spectrally separated from the first frequency band 6, via the second set of antenna ports 3. Furthermore, the receiver 5 is adapted for reception of signals within a third frequency band 8 via the third set of antenna ports 28, where the frequency band 8 comprises at least the first frequency band 6 and the second frequency band 7. This means that the first transmitter 4a is adapted for downlink (DL) transmissions via the first frequency band 6, the second transmitter 4b 4a is s adapted for DL transmissions via the second frequency band, and the receiver 5 is adapted for uplink (UL) transmissions via both frequency bands 6, 7.

According to some aspects the antenna system 1 comprises a switch assembly 25 that is adapted to switch the sets of antenna ports 2, 3 to either the transmitter arrangement 4 or to the receiver arrangement 5.

This enables all branches to be used for UL, keeping the uplink performance. Meanwhile, the transmit branches are split in two parts that enable larger frequency bands or scattered frequency bands. This is feasible when the receiver 5 can handle more bandwidth than the transmitter 4.

The first example, describe above, relates to a TDD (Time Division Duplex) system, where different time slots are assigned by means of the switch assembly 25. There exist other types of systems for accomplishing the present disclosure, for example an FDD (Frequency Division Duplex) system that will be described below as a second example.

Figure 4:
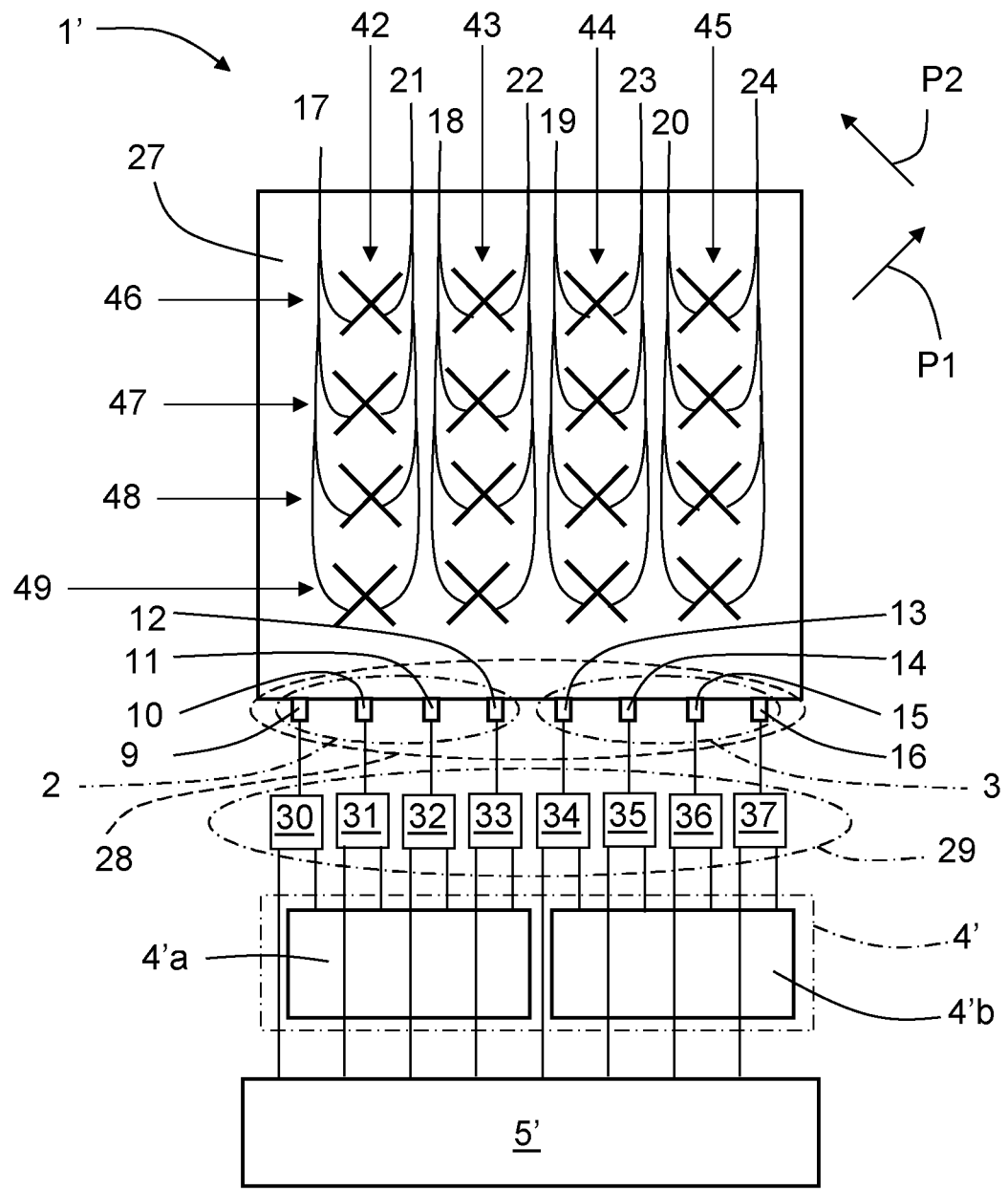
FIG. 4 schematically shows a front view of an antenna system according to a second example.

With reference to FIG. 4, there is an antenna system 1' having an antenna arrangement 27 antenna devices 17, 18, 19, 20; 21, 22, 23, 24 of two mutually orthogonal polarizations P1, P2, as well as sets of antenna ports 2, 3, 28 of the same type as described for the first example, where, according to some aspects, the sets of antenna ports 2, 3, 28 can be connected as described for the first example.

Figure 5:
FIG. 5 schematically shows frequency band positions.

With reference also to FIG. 5, the antenna system 1' further comprises a transmitter arrangement 4' and a receiver 5'. The transmitter arrangement 4' comprises a first transmitter 4a' that is adapted for transmission of signals within a first frequency band 38 and the second transmitter 4'b is adapted for transmission of signals within a second frequency band 39. The receiver 5' is adapted for reception of signals within a third frequency band 40 and a fourth frequency band 41, where all the frequency bands 38, 39, 40, 41 are mutually spectrally separated. This means that there are two DL frequency bands that correspond to the first frequency band 38 and the second frequency band 39. There are also two UL frequency bands that correspond to the third frequency band 40 and a fourth frequency band 41.

For this purpose, the antenna system 1' comprises a filter assembly 29 that is adapted to filter signals between on one hand the first and second sets antenna ports 2, 3 and on the other hand the transmitter arrangement 4' and to the receiver arrangement 5'. The filter assembly 29 comprises one filter 30-37 for each antenna port 9-16, each filter 30-37 being connected to, on one hand, a corresponding antenna port 9-16 and, on the other hand to the transmitter arrangement 4' and the receiver 5'. Each filter 30-37 is arranged for filtering the signal to and from the corresponding antenna port 9-16 between the DL frequency bands 38, 39 for the transmitter arrangement 4' and the UL frequency bands 40, 41 for the receiver 5'. According to some aspects, the DL frequency bands 38, 39 are positioned relatively close to each other, or adjacent, and constitute a common DL frequency band. Correspondingly, the UL frequency bands 40, 41 are positioned relatively close to each other, or adjacent, and constitute a common UL frequency band.

Generally, the first transmitter 4a, 4a' is adapted for transmission of signals by means of a first downlink communication resource 6, 38 via the first set of antenna ports 2 and a second transmitter 4b, 4b' adapted for transmission of signals by means of a second downlink communication resource 7, 39 via the second set of antenna ports 3. The receiver 5, 5' is adapted for reception of signals by means of a first uplink communication resource 6, 40 and a second uplink communication resource 7, 41 via the third set of antenna ports 28, where each communication resource defines, or is associated with, a certain bandwidth.

According to some aspects, at least one communication resource at least comprises one of a frequency channel, a time slot, and a coded channel.

In the following, some different types of realizations of the antenna system according to the present disclosure will be discussed. These realization are independent of the kind of communication resources used.

According to some other aspects, the first set of antenna ports 2 comprises antenna ports 9, 10, 11, 12 connected to at least one antenna device 17, 18, 19, 20 of the first polarization P1 and to at least one antenna device 21, 22, 23, 24 of the second polarization P2. The second set of antenna ports 3 comprises antenna ports 13, 14, 15, 16 connected to at least one antenna device 21, 22, 23, 24 of the second polarization P2 and to at least one antenna device 17, 18, 19, 20 of the first polarization P1. Different antenna ports 9, 10, 11, 12; 13, 14, 15 are connected to different antenna devices 17, 18, 19, 20; 21, 22, 23, 24. Each set of antenna ports 2, 3 is thus connected to both polarizations.

With reference to FIG. 3 and FIG. 4, according to some aspects, there is an antenna system 1, 1' that comprises an antenna arrangement 27 which in turn comprises a first number n of rows 46, 47, 48, 49 of antenna devices 17, 18, 19, 20; 21, 22, 23, 24 and a second number p of columns 42, 43, 44, 45 of antenna devices 17, 18, 19, 20; 21, 22, 23, 24.

In FIG. 3 and FIG. 4, the number n is four and the number p is also four.

Figure 6:
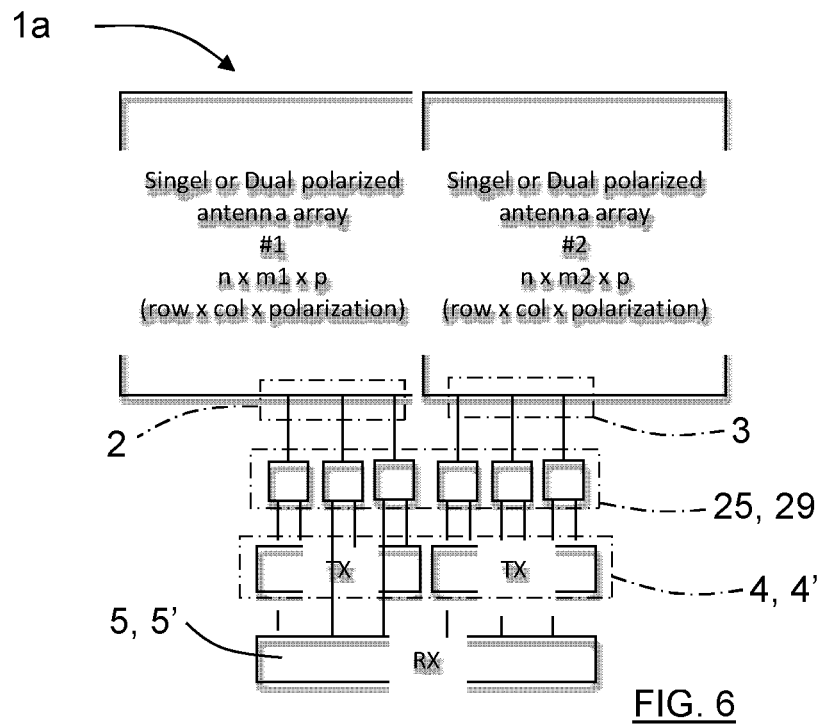
FIG. 6-7 schematically show different antenna system arrangements.

According to some aspect, with reference also to FIG. 6 showing an example of an antenna system 1a based on the above, the first set of antenna ports 2 is connected to a first set of columns 42, 43 comprising a comprising a third number m1 of columns and where the second set of antenna ports 3 is connected to a second set of columns 44, 45, separate from the first set of columns 42, 43 and comprising a fourth number m2 of columns, where the third set of antenna ports 28 comprises each one of the first set of antenna ports 2 and the second set of antenna ports 3. The antenna elements can here be single or dual polarized, in FIG. 6 they are shown as single polarized. Here two antenna sub-arrays #1, #2 are formed and placed side by side.

Figure 7:
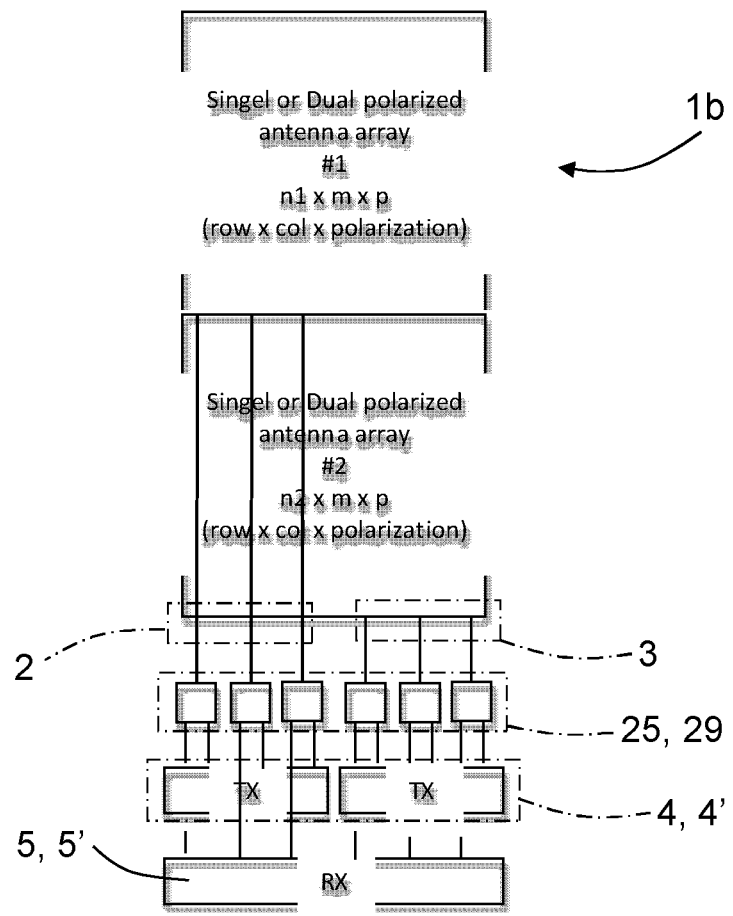

According to some aspect, with reference also to FIG. 7 showing another example of an antenna system 1b based on the above, the first set of antenna ports 2 is connected to a first set of rows 46, 47 comprising a fifth number n1 of rows, and where the second set of antenna ports 3 is connected to a second set of rows 48, 49, separate from the first set of rows 46, 47 and comprising a sixth number n2 of rows, where the third set of antenna ports 28 comprises each one of the first set of antenna ports 2 and the second set of antenna ports 3. The antenna elements can here be single or dual polarized, in FIG. 7 they are shown as single polarized. Here two antenna sub-arrays #1, #2 are formed and where one antenna sub-array #1 is placed on top of the other antenna sub-array #2.

As follows from the above, the antenna elements can thus be only single polarized or dual polarized.

According to some aspects, the number of antenna ports in the first set of antenna ports 2 falls below the number of antenna ports in the second set of antenna ports 3.

According to some aspects, the antenna system 1 is an active antenna system (AAS).

According to some aspects, each frequency band 6, 7; 38, 39, 40, 41 corresponds to a corresponding instantaneous bandwidth (IBW).

The present disclosure is not limited to the above, but may vary freely within the scope of the appended claims. For example, there can be any number of antenna ports, there is however at least two antenna ports.

The third set of antenna ports 28 at least partly comprises each one of the first set of antenna ports 2 and the second set of antenna ports 3.

According to some aspects, the communication resources are re-configurable for each antenna port 9, 10, 11, 12; 13, 14, 15, 16.

The present disclosure also relates to a wireless communication node 26 comprising at least one antenna system 1, 1'; 1a, 1b according to the above.

Figure 8:
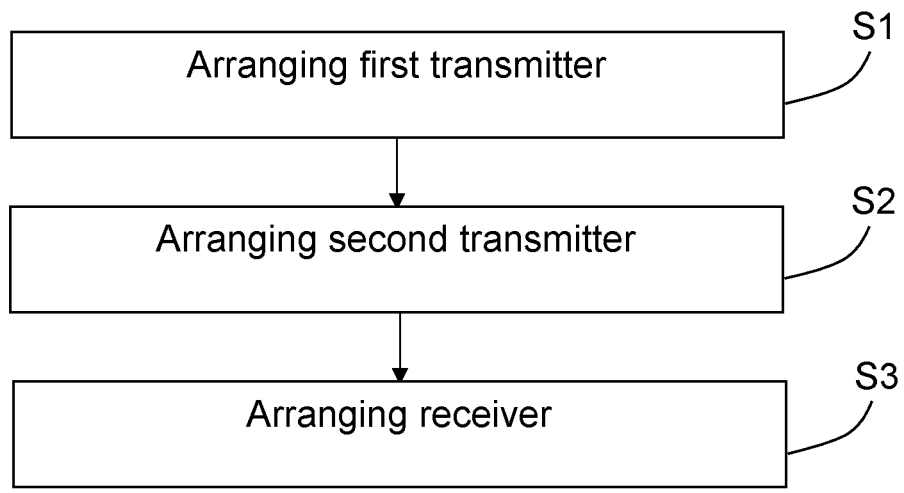
FIG. 8 shows a flowchart of methods according to the present disclosure.

With reference to FIG. 2, FIG. 4 and FIG. 8, the present disclosure relates to a method of configuring an antenna system 1, 1' using a first set of antenna ports 2, a second set of antenna ports 3 separate from the first set of antenna ports 2, a third set of antenna ports 28 that at least partly comprises each one of the first set of antenna ports 2 and the second set of antenna ports 3, a transmitter arrangement 4, 4' with a first transmitter 4a, 4'a and a second transmitter 4b, 4'b, and a receiver 5, 5'. The method comprises arranging S1 the first transmitter 4a, 4a' for transmission of signals by means of a first downlink communication resource 6, 38 via the first set of antenna ports 2, and arranging S2 the second transmitter 4b, 4b' for transmission of signals by means of a second downlink communication resource 7, 39 via the second set of antenna ports 3. the method further comprises arranging S3 the receiver 5, 5' for reception of signals by means of a first uplink communication resource 6, 40 and a second uplink communication resource 7, 41 via the third set of antenna ports 28, where each communication resource defines, or is associated with, a certain bandwidth.

According to some aspects, the at least one communication resource at least comprises one of a frequency channel, a time slot. and a coded channel.

Figure 9:
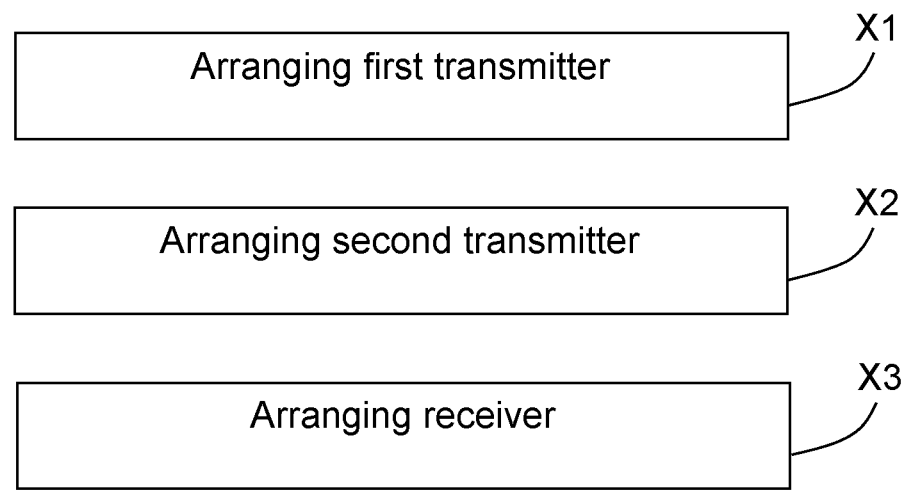
FIG. 9 illustrates an antenna system according to some aspects of the present disclosure.

With reference to FIG. 2, FIG. 4 and FIG. 9, the present disclosure relates to an antenna system 1, 1' that is adapted to be configured. The antenna system antenna system 1, 1' comprises a first set of antenna ports 2, a second set of antenna ports 3 separate from the first set of antenna ports 2, a third set of antenna ports 28 that at least partly comprises each one of the first set of antenna ports 2 and the second set of antenna ports 3, a transmitter arrangement 4, 4' with a first transmitter 4a, 4'a and a second transmitter 4b, 4'b, and a receiver 5, 5'.

The system further comprises:

A first arranging unit X1 configured to arrange the first transmitter 4a, 4a' for transmission of signals by means of a first downlink communication resource 6, 38 via the first set of antenna ports 2.

A second arranging unit X2 configured to arrange the second transmitter 4b, 4b' for transmission of signals by means of a second downlink communication resource 7, 39 via the second set of antenna ports 3.

A third arranging unit X3 configured to arrange the receiver 5, 5' for reception of signals by means of a first uplink communication resource 6, 40 and a second uplink communication resource 7, 41 via the third set of antenna ports 28, where each communication resource defines, or is associated with, a certain bandwidth.

Generally, the present disclosure relates to an antenna system 1, 1' comprising:
- a first set of antenna ports 2,
- a second set of antenna ports 3 separate from the first set of antenna ports 2,
- a third set of antenna ports 28 that at least partly comprises each one of the first set of antenna ports 2 and the second set of antenna ports 3,
- a transmitter arrangement 4, 4', and
- a receiver 5, 5'.

The transmitter arrangement 4, 4' comprises a first transmitter 4a, 4a' adapted for transmission of signals by means of a first downlink communication resource 6, 38 via the first set of antenna ports 2 and a second transmitter 4b, 4b' adapted for transmission of signals by means of a second downlink communication resource 7, 39 via the second set of antenna ports 3. The receiver 5, 5' is adapted for reception of signals by means of a first uplink communication resource 6, 40 and a second uplink communication resource 7, 41 via the third set of antenna ports 28, where each communication resource defines, or is associated with, a certain bandwidth.

According to some aspects, at least one communication resource at least comprises one of a frequency channel, a time slot. and a coded channel.

According to some aspects, the first transmitter 4a is adapted for transmission of signals within a first frequency band 6 and the second transmitter 4b is adapted for transmission of signals within a second frequency band 7 that at least partly is spectrally separated from the first frequency band 6, wherein the receiver 5 is adapted for reception of signals within a third frequency band 8 that comprises at least the first frequency band 6 and the second frequency band 7.

According to some aspects, the antenna system 1 comprises a switch assembly 25 that is adapted to switch the sets of antenna ports 2, 3 to either the transmitter arrangement 4 or to the receiver arrangement 5.

According to some aspects, the first transmitter 4'a is adapted for transmission of signals within a first frequency band 38 and the second transmitter 4'b is adapted for transmission of signals within a second frequency band 39, and where the receiver 5' is adapted for reception of signals within a third frequency band 40 and a fourth frequency band 41, where all the frequency bands 38, 39, 40, 41 are mutually spectrally separated.

According to some aspects, the antenna system 1' comprises a filter assembly 29 that is adapted to filter signals between on one hand the antenna ports 2, 3 and on the other hand the transmitter arrangement 4' and the receiver arrangement 5'.

According to some aspects, the antenna system 1 comprises an antenna arrangement 27 which in turn comprises at least one antenna device 17, 18, 19, 20 of a first polarization P1.

According to some aspects, the antenna system 1 comprises an antenna arrangement 27 which in turn comprises at least one antenna device 21, 22, 23, 24 of a second polarization P2 that is orthogonal to the first polarization P1.

According to some aspects, each set of antenna ports 2, 3 comprises at least one antenna port 9, 11, 13, 15 connected to at least one antenna device 17, 18, 19, 20 of the first polarization P1 and at least one antenna port 10, 12, 14, 16 connected to at least one antenna device 21, 22, 23, 24 of the second polarization P2, different antenna ports 9, 10, 11, 12; 13, 14, 15 being connected to different antenna devices 17, 18, 19, 20; 21, 22, 23, 24.

According to some aspects, the first set of antenna ports 2 comprises antenna ports 9, 10, 11, 12 connected to at least one antenna device 17, 18, 19, 20 of a first polarization P1, and where the second set of antenna ports 3 comprises antenna ports 13, 14, 15, 16 connected to at least one antenna device 21, 22, 23, 24 of a second polarization P2 that is orthogonal to the first polarization P1, different antenna ports 9, 10, 11, 12; 13, 14, 15 being connected to different antenna devices 17, 18, 19, 20; 21, 22, 23, 24.

According to some aspects, the antenna system 1 comprises an antenna arrangement 27 which in turn comprises a first number n of rows 46, 47, 48, 49 of antenna devices 17, 18, 19, 20; 21, 22, 23, 24 and a second number p of columns 42, 43, 44, 45 of antenna devices 17, 18, 19, 20; 21, 22, 23, 24.

According to some aspects, the first set of antenna ports 2 is connected to a first set of columns 42, 43 comprising a comprising a third number m1 of columns and where the second set of antenna ports 3 is connected to a second set of columns 44, 45, separate from the first set of columns 42, 43 and comprising a fourth number m2 of columns, where the third set of antenna ports 28 comprises each one of the first set of antenna ports 2 and the second set of antenna ports 3.

According to some aspects, the first set of antenna ports 2 is connected to a first set of rows 46, 47 comprising a fifth number n1 of rows, and where the second set of antenna ports 3 is connected to a second set of rows 48, 49, separate from the first set of rows 46, 47 and comprising a sixth number n2 of rows, where the third set of antenna ports 28 comprises each one of the first set of antenna ports 2 and the second set of antenna ports 3.

According to some aspects, the communication resources are re-configurable for each antenna port 9, 10, 11, 12; 13, 14, 15, 16.

The invention claimed is:

1. An antenna system comprising:
   a first set of antenna ports;
   a second set of antenna ports separate from the first set of antenna ports;
   a third set of antenna ports that at least partly comprises each one of the first set of antenna ports and the second set of antenna ports;
   a transmitter arrangement; and
   a receiver, wherein
   the transmitter arrangement comprises a first transmitter adapted for transmission of signals by means of a first downlink communication resource via the first set of antenna ports and a second transmitter adapted for transmission of signals by means of a second downlink communication resource via the second set of antenna ports, and
   the receiver is adapted for reception of signals by means of a first uplink communication resource and a second uplink communication resource via the third set of antenna ports, where each communication resource defines, or is associated with, a certain bandwidth.

2. The antenna system of claim 1, wherein at least one communication resource at least comprises one of a frequency channel, a time slot and a coded channel.

3. The antenna system of claim 1, wherein the first transmitter is adapted for transmission of signals within a first frequency band and the second transmitter is adapted for transmission of signals within a second frequency band that at least partly is spectrally separated from the first frequency band, wherein the receiver is adapted for reception of signals within a third frequency band that comprises at least the first frequency band and the second frequency band.

4. The antenna system of claim 3, wherein the antenna system comprises a switch assembly that is adapted to switch the sets of antenna ports to either the transmitter arrangement or to the receiver arrangement.

5. The antenna system of claim 1, wherein the first transmitter is adapted for transmission of signals within a first frequency band and the second transmitter is adapted for transmission of signals within a second frequency band, and where the receiver is adapted for reception of signals within a third frequency band and a fourth frequency band, where all the frequency bands are mutually spectrally separated.

6. The antenna system of claim 5, wherein the antenna system comprises a filter assembly that is adapted to filter signals between on one hand the antenna ports and on the other hand the transmitter arrangement and the receiver arrangement.

7. The antenna system of claim 3, wherein each frequency band corresponds to a corresponding instantaneous bandwidth.

8. The antenna system of claim 1, wherein the antenna system is an active antenna system, AAS.

9. The antenna system of claim 1, wherein the antenna system comprises an antenna arrangement which in turn comprises at least one antenna device of a first polarization (P1).

10. The antenna system of claim 9, wherein the antenna system comprises an antenna arrangement which in turn comprises at least one antenna device of a second polarization that is orthogonal to the first polarization.

11. The antenna system of claim 10, wherein each set of antenna ports comprises at least one antenna port connected to at least one antenna device of the first polarization and at least one antenna port connected to at least one antenna device of the second polarization, different antenna ports being connected to different antenna devices.

12. The antenna system of claim 10, wherein the first set of antenna ports comprises antenna ports connected to at least one antenna device of a first polarization, and where the second set of antenna ports comprises antenna ports connected to at least one antenna device of a second polarization that is orthogonal to the first polarization, different antenna ports being connected to different antenna devices.

13. The antenna system of claim 1, wherein the antenna system comprises an antenna arrangement which in turn comprises a first number of rows of antenna devices and a second number of columns of antenna devices.

14. The antenna system of claim 13, wherein the first set of antenna ports is connected to a first set of columns comprising a comprising a third number of columns and where the second set of antenna ports is connected to a second set of columns, separate from the first set of columns and comprising a fourth number of columns, where the third set of antenna ports comprises each one of the first set of antenna ports and the second set of antenna ports.

15. The antenna system of claim 13, wherein the first set of antenna ports is connected to a first set of rows comprising a fifth number of rows, and where the second set of antenna ports is connected to a second set of rows, separate from the first set of rows and comprising a sixth number of rows, where the third set of antenna ports comprises each one of the first set of antenna ports and the second set of antenna ports.

16. The antenna system of claim 1, wherein the number of antenna ports in the first set of antenna ports falls below the number of antenna ports in the second set of antenna ports.

17. The antenna system of claim 1, wherein the communication resources are re-configurable for each antenna port.

18. A wireless communication node comprising the antenna system of claim 1.

19. A method of configuring an antenna system using a first set of antenna ports, a second set of antenna ports separate from the first set of antenna ports, a third set of antenna ports that at least partly comprises each one of the first set of antenna ports and the second set of antenna ports, a transmitter arrangement with a first transmitter and a second transmitter, and a receiver, where the method comprises:
   arranging the first transmitter for transmission of signals by means of a first downlink communication resource via the first set of antenna ports;
   arranging the second transmitter for transmission of signals by means of a second downlink communication resource via the second set of antenna ports,
   arranging the receiver for reception of signals by means of a first uplink communication resource and a second uplink communication resource via the third set of antenna ports, where each communication resource defines, or is associated with, a certain bandwidth.

20. The method of claim 19, wherein the at least one communication resource at least comprises one of a frequency channel, a time slot, and a coded channel.

\* \* \* \* \*